United States Patent [19]

Andersen et al.

[11] 4,188,088
[45] Feb. 12, 1980

[54] OPTICAL ELEMENT FOR USE IN OPTICAL TRANSMISSION MEANS

[75] Inventors: Axel Andersen, Gentofte; Poul U. Knudsen, Hellerup; Knud B. Jensen, Skodsborg, all of Denmark

[73] Assignee: Aktieselskabet Nordiske Kabel-OG Traadfabriker, Copenhagen, Denmark

[21] Appl. No.: 848,694

[22] Filed: Nov. 4, 1977

[30] Foreign Application Priority Data

Nov. 9, 1976 [DK] Denmark ............................ 5053/76

[51] Int. Cl.² ................................................ G02B 5/14
[52] U.S. Cl. ................................................. 350/96.23
[58] Field of Search ........................... 350/96.23, 96.24

[56] References Cited

U.S. PATENT DOCUMENTS

| | | | |
|---|---|---|---|
| 3,758,951 | 9/1973 | Scrivo et al. | 350/96.23 X |
| 3,865,466 | 2/1975 | Slaughter | 350/96.23 |
| 3,883,218 | 5/1975 | Slaughter | 350/96.23 |
| 3,887,265 | 6/1975 | Margolis et al. | 350/96.23 |
| 3,937,559 | 2/1976 | Ferrentino et al. | 350/96.23 |
| 4,076,382 | 2/1978 | Oestreich | 350/96.23 |
| 4,097,119 | 6/1978 | Kumamaru et al. | 350/96.23 |

FOREIGN PATENT DOCUMENTS

| | | | |
|---|---|---|---|
| 2507583 | 9/1976 | Fed. Rep. of Germany | 350/96.23 |
| 2539017 | 3/1977 | Fed. Rep. of Germany | 350/96.23 |
| 2274123 | 1/1976 | France | 350/96.23 |
| 2319912 | 2/1977 | France | 350/96.23 |
| 1457868 | 12/1976 | United Kingdom | |
| 1479427 | 7/1977 | United Kingdom | |

*Primary Examiner*—John K. Corbin
*Assistant Examiner*—John D. Lee
*Attorney, Agent, or Firm*—Ladas, Parry, Von Gehr, Goldsmith & Deschamps

[57] ABSTRACT

An optical element for use in optical transmission comprising one or more optical fibers provided with an essentially tight-fitting coating and a strength member provided with an essentially tight-fitting coating of the same material, each of said coatings having an essentially circular cross-section, wherein the coating or coatings on the optical fibers are firmly connected with the coating on the strength member by connection means of the same material, and whose thickness is substantially smaller than the diameter of the coatings and where further the fiber or fibers are given a curve or wave shaped course. The connection means can be a continuous or locally broken fin and the coating can be applied commonly or separately around the fibers. Optical transmission means comprising such optical elements are described.

15 Claims, 9 Drawing Figures

OPTICAL ELEMENT FOR USE IN OPTICAL TRANSMISSION MEANS

BACKGROUND OF THE INVENTION

1. Field of the Invention

The present invention relates to an optical element for use in optical transmission means, for example in tele-cables, which element is of the type comprising one or more optical fibers, each of which is possibly provided with a protective layer applied around the fiber and which furthermore comprises a strength member. The invention further relates to optical transmission means comprising such optical elements.

2. Description of the Prior Art

It is known to produce tele-cables with optical fibers where the fibers are placed in the cables in longitudinal spaces with cross-sectional dimensions considerably bigger than the fiber diameter, cf. for example the Swedish patent application No. 75,08599-3 (corresponding to DT-OS No. 25 28 991).

It is also known to establish a twisted placing of the fibers in such spaces. Moreover, it is known to adhere fibers in undulated paths between two plastic bands which then are wound around a central reinforcing member, cf. U.S. Pat. No. 3,937,559 (DT-OS No. 24 24 041). Furthermore, cables are known too where the fibers are wound helically around a soft support layer being placed around a massive support wire, cf. U.S. Pat. No. 3,883,218 (DT-OS No. 23 55 854). It is a common aim of these known cable types to prevent as far as possible the mechanical impacts of tension or bending from affecting the optical fibers, and especially to prevent detrimental tensile impacts.

Further, it is universally known to provide the cables with strength members which serve the function of absorbing the tensile effects to which the cable is exposed, for example during handling and laying out, cf. for example the above Swedish application and U.S. Pat. No. 3,887,265 (DT-OS No. 23 55 853), U.S. Pat. No. 3,865,466 (DT-OS No. 23 55 855) and DT-OS No. 24 49 439.

However, in none of the said cable types is the part of the cable comprising the optical fiber or fibers firmly connected to the strength member simultaneously with its assuming a curve or wave shape in relation to said member.

The object of the present invention is to provide constructional characteristics whereby it is possible to a greater extent than heretofore to avoid deterioration or destruction of the optical fibers in respect of their transmission capability as a consequence of mechanical impacts, such as tension, bending and torsion. In this connection it must be remembered that deterioration or even destruction of an otherwise perfect fiber can be expected if due to one or more defects its light conducting interior is narrowed or bent even at an extremely small part of a cable section where the magnitude of the extent of the defect is only a fraction of a millimeter for which reason such defects are referred to as microcracks or microbendings. It is obvious that a tensile force affecting the optical fiber will increase the possibility of cracks the bigger the tensile force is. In the heretofore known construction of tele-cables with optical fibers efforts have been made, as previously stated, to reduce the size and risk of tensile stresses in the optical fibers, for example by the mentioned forms of twisted or helical placing of the fibers in the jacket possibly in combination with more or fewer strength members.

DESCRIPTION OF THE DRAWINGS

FIG. 2A corresponds to FIG. 1, while FIG. 2B shows a wider fin and FIG. 2C shows several optical fibers with a common coating.

DESCRIPTION OF THE INVENTION

Figure 1:
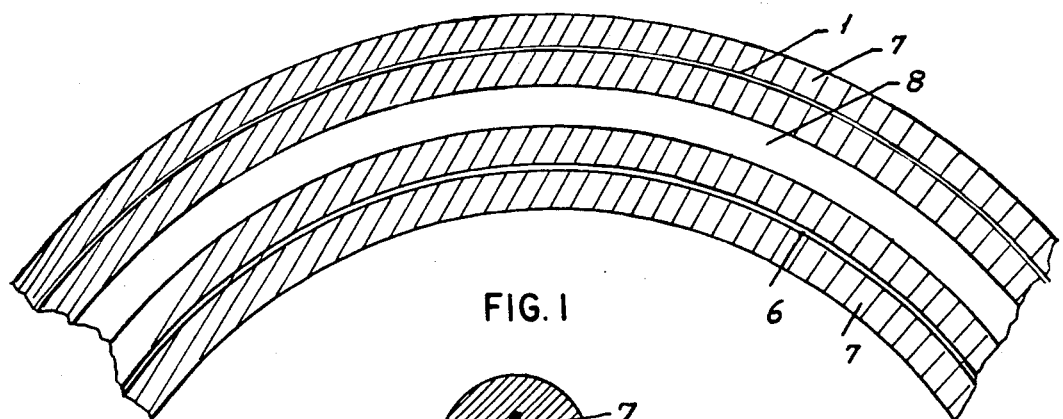
FIG. 1 from the side shows a part of an optical element according to the invention, comprising one optical fiber and a strength member.

The present invention departs from the conventional principle as it is characteristic of the invention that the fiber or fibers possible provided with a protective layer and the strength member are provided with an essentially tight-fitting coating of the same material applied separately or commonly around one or more fibers and around the strength member with an essentially circular cross section, the coating or coatings on the optical fibers being firmly connected with the coating on the strength member by means of connection means, such as a continuous or locally broken fin whose thickness is substantially smaller than the diameter of the coatings, and where further the fiber or fibers are given a curve or wave shaped course in relation to the straight course of the strength member.

Before describing the invention in greater detail we would comment on two publications illustrating the immediate prior art:

DT-OS No. 25 25 067 describes cables comprising a large number of optical fibers either grouped, for example in concentric layers, around a central strength member or, in the embodiment which comes nearest to the invention, placed in bundles or layers in a common sheath connected by means of a short fin, which is not explained in detail, to a sheath surrounding a strength member.

Such a cable departs in important respects from an optical element according to the invention as defined above and in claim 1.

Firstly, the mentioned sheath cannot be regarded as a tight-fitting coating around one or more optical fibers. On the contrary, there are inserted several neutralizing intermediate layers, layers with low friction etc. to make it possible that the fibers can give without being cracked, and the fibers are thus not provided with a separate or common coating.

Secondly, the optical fibers are not given a curve or wave shaped course in relation to the strength member.

The specific embodiments explained in greater detail below, are not shown either in said publication.

DT-OS No. 26 04 307 shows several embodiments of optical cables having the common feature that one or more fibers are placed loosely in separate tubes or hoses which then are surrounded by an external protective sheath. Moreover, the cable is provided with one or more strength members which can be embedded in the sheath itself, be placed centrally or peripherally in the sheath or—in the only embodiment (FIG. 4) being of interest to the invention—be embedded in a projection on the surface of each of the external tubes, in which the fibers, as mentioned, are located loosely without firm connection with the tube and thus also without connection with the strength member.

The said projection can not be characterized as a fin whose thickness is considerably smaller than that of the coatings and neither does it contribute to give the fibers a curve shaped course.

This curved course can according to the invention be established for example by exposing the strength member during application of the coatings, which can be done with advantage by extrusion, to a tensile impact giving the strength member an elastic elongation while the optical fiber or fibers during this is essentially free from tension. During the subsequent relief and contraction of the strength member the part or parts of the element containing optical fibers will assume a curve or wave shaped course because of the connecting fin.

Further, by means of a suitable shaping of the extrusion tool it can be achieved according to the invention that the part or parts of the element containing optical fibers will become longer than the part containing the strength member. The optical fibers will then assume a curve or wave shaped course.

The thickness and width of the fin depend especially on the properties of the coating material, the intended use of the element and the consequent, desired curve or wave shape. The thickness must however, be of such a nature that the fin can withstand the twisting to which it is exposed without cracking, and the width must be so large that the established curve or wave shape can accommodate the overlength of the fiber in relation to the strength member. Therefore, the width is preferably larger than the diameter of the coatings.

It will be understood that an element according to the invention, if it contains several optical fibers, either can have these joined in more or fewer common coatings, or can have a separate coating for each fiber.

The coating used can for example consist of a natural or synthetic polymer material, such as polyethylene, polypropylene or copolymers thereof, polyvinyl chloride or a polyamide, such as polyamide 11 or 12, where the latter group of material is preferred because of its good adhesive properties. However, this ennumeration should not be construed as limitary since the choice of coating material is not critical to the invention.

If desired, the coating can further comprise an additive, for example a reinforcement material such as longitudinal fibers. Other additives are for example arbitrarily orientated fibers, inorganic or organic fillers, cross-linkers, pigments, dyes, etc.

If one or more of the subject elements are placed in a sheath to form for example a tele-cable without being exposed to tensile forces during this process, the elements will maintain their curve or wave shape. It will be seen that a cable containing such elements withstands tensile impacts to an exceptionally high degree.

The invention is illustrated in greater detail on the drawing where

Figures 2A, 2B, 2C:
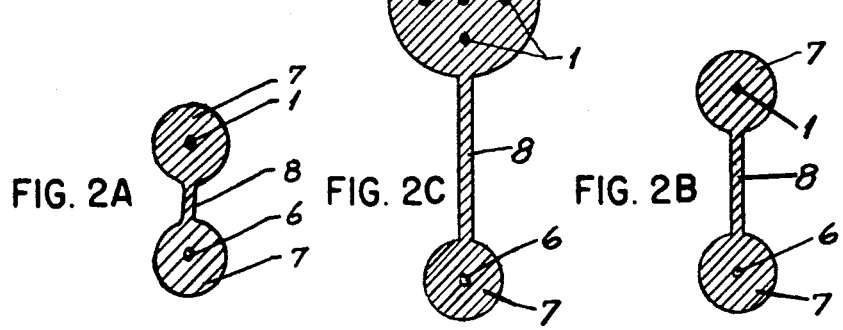
FIGS. 2A–2C show a section of three different embodiments of an element according to the invention.

FIGS. 1 and 2A show the optical fiber 1, the coating 7, which for example can be of a polymer material, as well as the strength member 6 produced from a material with a high elasticity modulus, for example a synthetic fiber material or a metal. The fin 8 contributes to the curved course of the element.

FIG. 2B shows a preferred embodiment where the fin 8 is wider than the diameter of the coatings. FIG. 2C shows an embodiment having five optical fibers provided with a common coating having a bigger diameter than the coating of the strength member. The same numerals are used.

Figure 3:
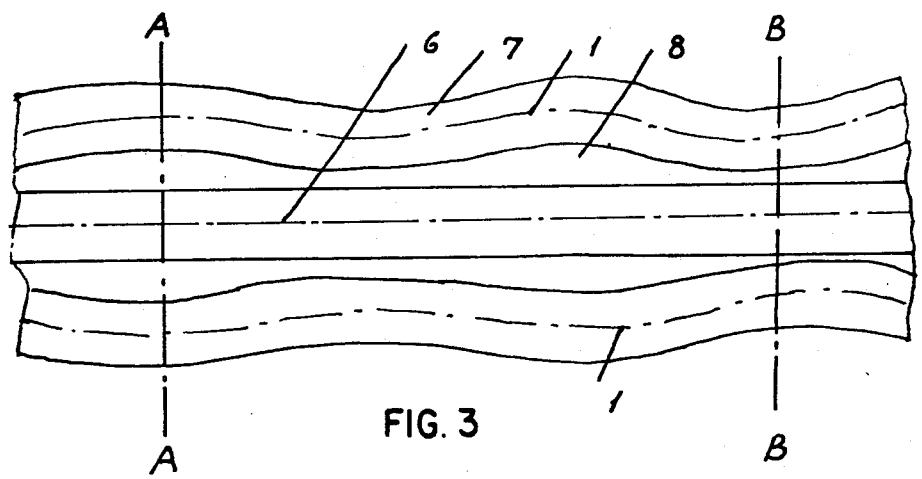
FIG. 3 shows, seen from the side, a part of an optical element according to the invention, comprising a central strength member and two optical fibers in wave shape.
Figure 4:
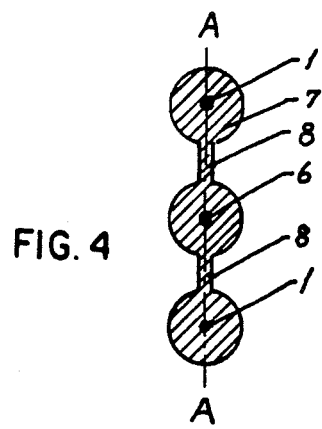
FIG. 4 shows a cross section AA on FIG. 3.
Figure 5:
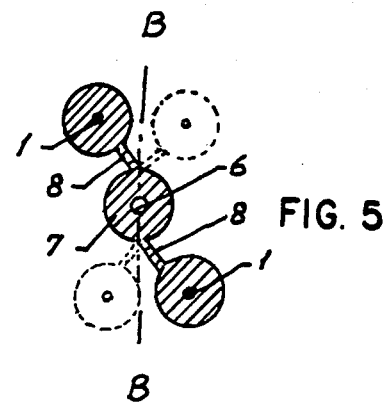
FIG. 5 shows a cross section BB on FIG. 3.

FIGS. 3-5 show an embodiment having two optical fibers 1, the same numerals being used as in FIGS. 1 and 2. On the figures the optical fibers are situated diametrically opposite in relation to the strength member, but can in principle form any conceivable angle with this.

Figure 6:
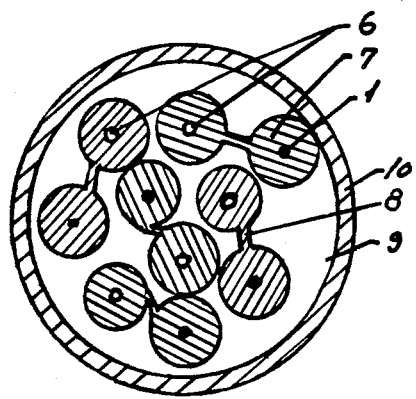
FIG. 6 shows a cross section of a tele-cable having optical elements of the type shown in FIG. 1.

FIG. 6 shows a tele-cable having five optical elements of the subject type with one optical fiber 1, strength member 6, coating 7 and fin 8. The elements are placed in spaces 9, which can possibly be provided with a filler, for example vaseline, in a tubular jacket 10, which for example can be a polymer sheath.

Figure 7:
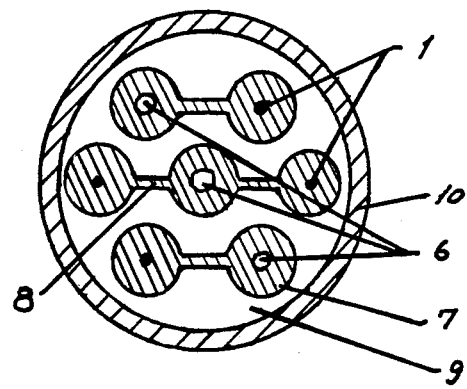
FIG. 7 shows a cross section of a tele-cable having two optical elements of the type shown in FIG. 1 and one element of the type shown in FIG. 3.

FIG. 7 shows a similar cable where there are two optical elements having one optical fiber 1 and one element (with two optical fibers 1) of the type shown in FIG. 3. The numerals are the same as in FIG. 6.

What we claim is:

1. An optical element for use in optical transmission means and comprising a strength member and at least one optical fiber wherein said optical fiber or fibers are provided with an essentially tight-fitting coating and the member is provided with an essentially tight-fitting coating of the same material, each of said coatings having an essentially circular cross-section, the coating or coatings on the optical fibers further being firmly connected with the coating on the strength member by connection means of the same material as the coatings, and whose thickness is substantially smaller than the diameter of the coatings and where further the fiber or fibers are given a curve shaped course.

2. An optical element according to claim 1 wherein the optical fibers are provided with an intermediate protective layer.

3. An optical element according to claim 1, wherein said connection means is a continuous fin.

4. An optical element according to claim 1, wherein said connection means is a locally broken fin.

5. An optical element according to claim 1, wherein the optical fibers are embedded in at least one common coating.

6. An optical element according to claim 1, wherein the optical fibers are embedded in separate coatings.

7. An optical element according to claim 1, wherein the width of the connection means is larger than the diameter of the coatings.

8. An optical element according to claim 1, wherein the curved course of the fiber or fibers is established by exposing the strength member to a tensile impact during application of the coating and a subsequent relief.

9. An optical element according to claim 8, wherein the coating further comprises a reinforcement material.

10. An optical element according to claim 1, wherein the curved course of the fiber or fibers is established by applying the coating in such a way that the length of the coated optical fibers exceeds the length of the strength member.

11. An optical element according to claim 1, wherein the coating comprises a polymer material.

12. An optical element according to claim 11 wherein the polymer material is chosen from the group consisting of a polyethylene, polypropylene and copolymers thereof, polyvinylchloride and polyamide.

13. Optical transmission means comprising at least one optical element located in a sheath, wherein said optical element comprises at least one optical fiber which is provided with an essentially tight-fitting coating and a strength member provided with an essentially tight-fitting coating of the same material, each of said coatings having an essentially circular cross-section, the coating or coatings on the optical fibers further being firmly connected with the coating on the strength member by a connection means of the same material as the coating, and whose thickness is substantially smaller than the diameter of the coatings and where further the fiber or fibers are given a curve shaped course.

14. Optical transmission means according to claim 13, wherein said connection means is a continuous fin.

15. Optical transmission means according to claim 13, wherein said connection means is a locally broken fin.